United States Patent
Kawada

[15] 3,636,386
[45] Jan. 18, 1972

[54] HIGH-VOLTAGE SOURCE DEVICES UTILIZING PIEZOELECTRIC ELEMENTS

[72] Inventor: Takehiko Kawada, Yokohama, Japan

[73] Assignee: Denki Onkyo Company, Limited, Ohota-ku, Tokyo, Japan

[22] Filed: May 4, 1970

[21] Appl. No.: 34,157

[30] Foreign Application Priority Data

May 8, 1969 Japan..................................44/42113
Sept. 19, 1969 Japan..................................44/88861
Oct. 4, 1969 Japan..................................44/94856

[52] U.S. Cl...............................310/8.1, 310/8.3, 310/9.7, 323/8, 331/73, 333/71
[51] Int. Cl. ..........................................................H01v 7/00
[58] Field of Search....................310/8.1, 8.2, 8.3, 8.6, 9.4, 310/9.7; 323/17, 22 Z, 8; 321/8; 331/73, 116, 155, 158, 163; 333/71

[56] References Cited

UNITED STATES PATENTS 2,975,354  3/1961  Rosen.................................310/8.1 X
3,263,092  7/1966  Knauss...........................323/22 ZD X

FOREIGN PATENTS OR APPLICATIONS 1,122,141  1/1962  Germany...................................323/8

Primary Examiner—Gerald Goldberg
Attorney—Chittick, Pfund, Birch, Samuels & Gauthier

[57] ABSTRACT

In a high-voltage source device comprising a piezoelectric element including a driving electrode and an output electrode, a driving source for applying a driving voltage to the driving electrode and a rectifier circuit connected to the output electrode to supply a high DC voltage to a load, there are provided a constant voltage element connected to the output electrode in parallel with the rectifier circuit to shunt the increments of the output from the piezoelectric element thus providing a constant output voltage.

4 Claims, 9 Drawing Figures

PATENTED JAN 18 1972 3,636,386
SHEET 1 OF 2
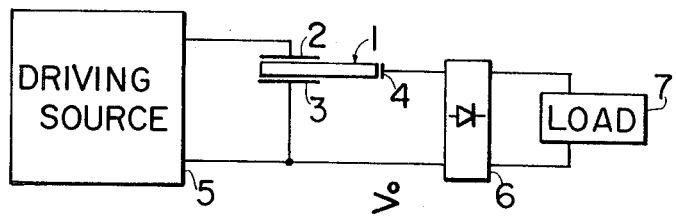
FIG. 1
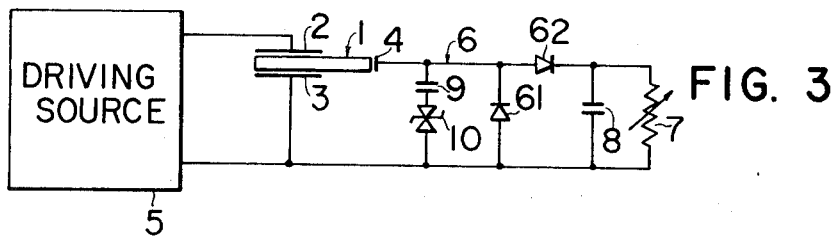
FIG. 2
FIG. 3
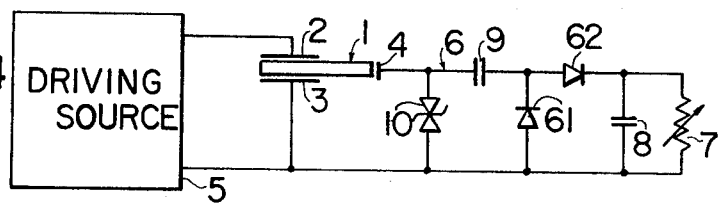
FIG. 4
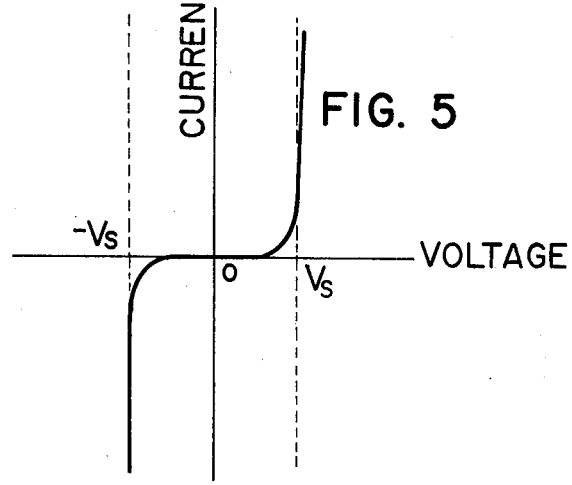
FIG. 5
TAKEHIKO KAWADA INVENTOR
BY Chittick, Pfund, Birch
Samuels & Gauthier
ATTORNEY

TAKEHIKO KAWADA INVENTOR

HIGH-VOLTAGE SOURCE DEVICES UTILIZING PIEZOELECTRIC ELEMENTS

BACKGROUND OF THE INVENTION

This invention relates to a high-voltage source device utilizing a piezoelectric element and more particularly to a high-voltage source device utilizing a piezoelectric element and capable of providing a stable output voltage.

As is well known in the art, as a high-voltage source for a cathode-ray tube of a television receiver, for example, a flyback transformer cooperating with the horizontal deflection circuit has been used. However, since the flyback transformer utilizes a step-up winding it is bulky and can not meet recent requirement for miniaturization of electronic devices. Recently a high-voltage source device utilizing a piezoelectric element has become of interest to be used as a high-voltage source of small size. In such a high-voltage source device utilizing a piezoelectric element the voltage of an input is stepped up by the piezoelectric element having an excellent conversion efficiency and the stepped up AC output voltage is rectified to supply a high DC voltage to a load. However, since the impedance of the piezoelectric element as viewed from its output terminal is high, there is a difficulty such that the output voltage of the piezoelectric element varies greatly when the load current of the source device varies. Accordingly, when such a high-voltage source device is utilized as the anode source of a television-receiving tube, variation in the anode current for the purpose of adjusting the brightness of the image results in the variation in the anode voltage. This results in the variation of the deflection efficiency causing widening or reduction of the picture size.

SUMMARY OF THE INVENTION

Accordingly it is an object of this invention to provide an improved stable high-voltage source device capable of generating a substantially constant output voltage over a certain range irrespective of the variation of the load connected to the source.

Another object of this invention is to provide a novel high-voltage source device including a voltage-sensing means which detects an output of the piezoelectric element exceeding a predetermined value to prevent a voltage higher than a predetermined value from being applied to rectifying means.

A further object of this invention is to provide an improved high-voltage source device including a voltage-multiplying and rectifying circuit interposed between the output of a piezoelectric element and a load and a voltage-sensing means of simple construction and of high mechanical strength whereby to stabilize the output voltage.

Still further object of this invention is to provide a novel high-voltage source device wherein an output from the voltage sensing means is utilized to control the frequency of a driving source for the piezoelectric device thereby stabilizing the output of the source device.

Further objects and advantages of the invention will become apparent from the following detailed description taken in conjunction with the accompanying drawing in which:

FIG. 1 shows a diagrammatic block diagram of a high-voltage source device utilizing a piezoelectric element;

FIG. 2 shows a load current (output current) (−) output voltage characteristic curve of a high-voltage source device to explain the operation of this invention;

FIGS. 3 and 4 illustrate different embodiments of this invention;

FIG. 5 shows a voltage-current characteristic curve of a voltage-sensing means employed in this invention and FIGS. 6 to 9 inclusive are circuit diagrams of further modifications of this invention.

DESCRIPTION OF THE PREFERRED EMBODIMENTS

Figure 6:
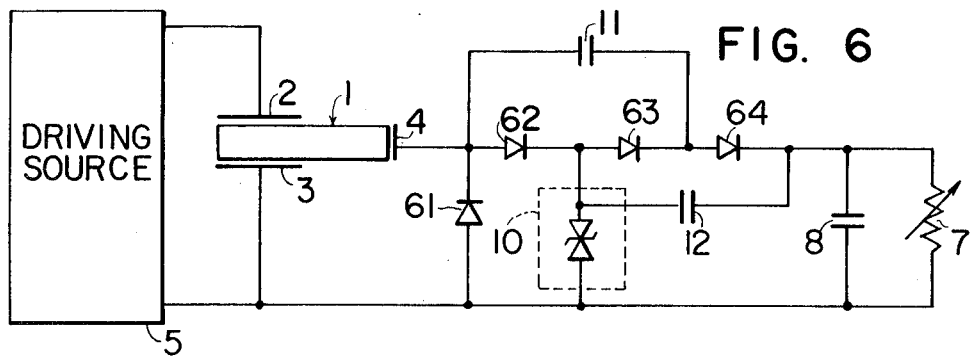

Referring now to FIG. 1 of the accompanying drawing there is shown a high-voltage source device comprising a piezoelectric element 1 having a pair of opposed driving electrodes 2 and 3 at its one end and an output electrode 4 on the opposite end. As is well known in the art when a voltage having a frequency which is the same or near the natural vibration frequency of the piezoelectric element 1 is impressed across driving electrodes 2, 3 from a driving source 5 a high voltage will be generated at the output electrode 4, which is supplied to a load 7 after being rectified by a rectifier circuit 6. Consequently, when a high-voltage source device of this construction is utilized as the anode source of a television receiving tube, the load 7 is comprised by the anode electrode of the tube. As has been pointed out hereinbefore, in the high-voltage source device utilizing the piezoelectric element 1, as the load 7 connected therewith varies, in other words as the current flowing through the load varies, the voltage across the load 7 will also vary as shown by solid curve A in FIG. 2. For this reason it is necessary to maintain the output voltage at a constant value over a certain range irrespective of the variation in the load, as shown by a dotted line B shown in FIG. 2. Such stabilization of the load voltage or prevention of an excessive voltage from being applied across the load may be realized by connecting a constant voltage gas discharge valve across the output terminals of the source device. However, it is not possible to manufacture a constant voltage gas discharge valve capable of withstanding an extremely high voltage ranging from several thousands to hundred thousands volts.

In the embodiments shown in FIGS. 3 and 4 a rectifier circuit 6 is employed comprising a pair of diodes 61 and 62 and a smoothing capacitor 8. In the embodiment shown in FIG. 3 a series circuit including a capacitor 9 and a varistor 10 is connected in parallel with the high-voltage output terminals of the piezoelectric element 1. Whereas in the embodiment shown in FIG. 4 varistor 10 is connected in parallel with the output terminals of the piezoelectric element 1 and capacitor 9 is connected in series with the succeeding rectifier circuit and in series with an output terminal of the piezoelectric element in parallel with the varistor 10. The voltage (−) current characteristics of the varistor 10 is shown in FIG. 5. As shown by this curve, as soon as the voltage applied across varistor 10 exceeds $\pm V_s$, the resistance abruptly decreases to substantially zero thus becoming conductive to pass a large current. For this reason, as long as the crest value of the alternating current generated at the output electrode 4 of the piezoelectric element 1 is smaller than the trigger voltage $|V_s|$ of varistor 10, the output of the element 1 will be applied to the rectifier circuits 61, 62 whereas when the crest value of the output from the element 1 exceeds the trigger voltage $|V_s|$, portions of the output above the trigger voltage will be shunted by the varistor so that the maximum value of the voltage supplied to the rectifier circuit will be limited to $|V_s|$. Accordingly, by setting the trigger voltage of the varistor 10 to be equal to the desired constant voltage B, in FIG. 2, the high-voltage source can provide a stable output irrespective of the variation of the load 7. The purpose of capacitor 9 is to prevent DC output component from being applied to varistor 10 to shift the operating point thereof.

Figure 7:
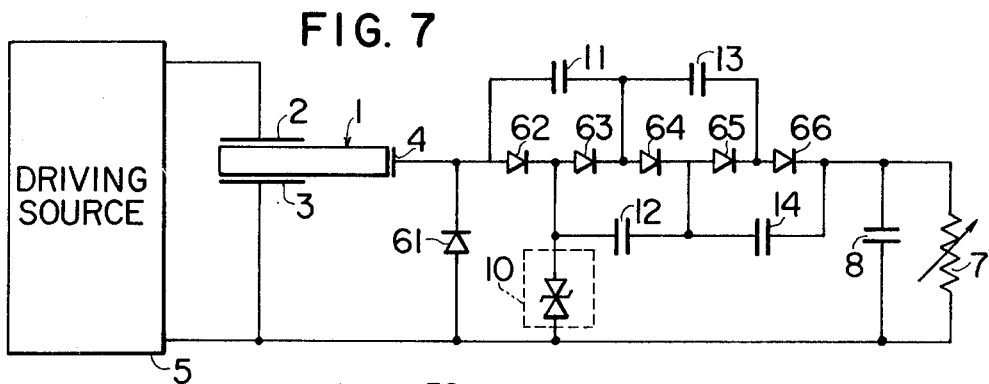

In still other modified embodiments of this invention shown in FIGS. 6 and 7 the rectifier circuit adapted to rectify the output voltage of the piezoelectric element is of the voltage-multiplying and rectifying type. The reason for employing a voltage-multiplying and rectifying circuit in combination with the high-voltage source device employing the piezoelectric element is to have as high as possible output voltage and to match the impedance of the output impedance of the piezoelectric element with that of the load because the output impedance is extremely high. For this reason, the voltage-multiplying and rectifying circuit is used in combination with the high-voltage source device employing the piezoelectric element. According to FIGS. 6 and 7 of this invention, a constant voltage varistor 10 is connected to a point of twice rectified voltage. This is because at this point only the DC component produced by rectifying the AC output of the element 1 by means of diodes 61 and 62 appears. Since it is only necessary to compare the magnitude of this DC component with the trigger voltage of the constant voltage varistor it is not necessary to use a blocking capacitor as shown in FIGS. 3 and 4. Although the constant voltage varistor may be connected across the output terminals of the voltage-multiplying and rectifying circuit such an arrangement requires a varistor of high-breakdown voltage and hence of a large length. Such a high-voltage varistor is of course expensive and does not have sufficient mechanical strength. By connecting the varistor at a point of the twice rectified voltage it is not only possible to eliminate the DC blocking capacitor but also reduce the breakdown strength of the varistor. Although the varistor connected to the point of twice rectified voltage must pass current larger than that when it is connected across the output terminals of the voltage-multiplying and rectifying circuit, such increase in the current capacity of the varistor also increases its diameter and hence its mechanical strength.

Figure 8:
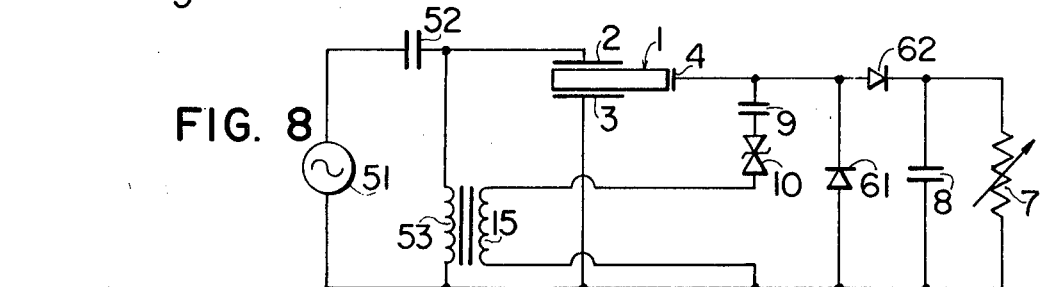
Figure 9:
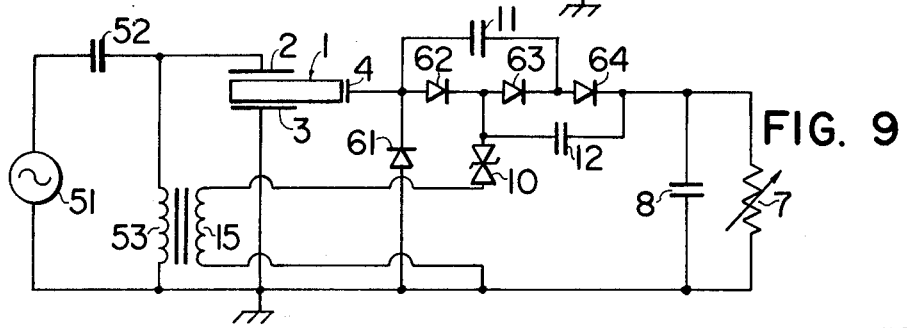

In the above described embodiments increments of the output voltage of the piezoelectric element caused by the variation of the load are shunted by the varistor whereby to maintain the load voltage at a constant value while the piezoelectric element is maintained at the resonance condition to produce the maximum output. FIGS. 8 and 9 show other modifications of this invention wherein the increase in the output of the piezoelectric element caused by the variation of the load is sensed by a sensing means to shift the piezoelectric element from its resonance condition to decrease the output of the element thus applying a constant voltage to the load. As has been pointed out in connection with previous embodiments, the frequency of the driving source 5 for the piezoelectric element 1 is equal or nearly equal to the mechanical resonance frequency of the element. The detail of the connection of the driving source 5 is shown in FIGS. 8 and 9. In these figures reference numeral 51 designates an AC source having a frequency near the mechanical resonance frequency of the piezoelectric element 1. A series circuit comprising a capacitor 52 and a coil 53 of a saturable reactor is connected across the AC source 51, the capacitor 52 and coil 53 comprising a series resonance circuit, the resonance frequency thereof being the same or close to the mechanical resonance frequency of the piezoelectric element 1. In the embodiment shown in FIG. 8 a series circuit including a varistor 10 and the secondary coil 15 of the saturable reactor is connected across the output electrode 4 of the piezoelectric element and the ground, via a DC blocking capacitor 9. When the output voltage of the piezoelectric element 1 exceeds the trigger voltage 1V,1 of the varistor shown in FIG. 5, varistor 10 becomes conductive to pass current to the ground through the secondary coil 15. Since coils 15 and 53 are coupled to each other, this will change the inductance of coil 53. Consequently, the resonance frequency of the series resonance circuit comprised by capacitor 52 and coil 53 is varied from the mechanical resonance frequency of the piezoelectric element 1 in proportion to the current flowing through the varistor thus decreasing the output from the piezoelectric element 1. In this manner, regardless of the variation in load 7, the voltage supplied thereto is maintained at a constant value as shown by curve B, in FIG. 2, thus stabilizing the output voltage.

In the modified embodiment shown in FIG. 9 a varistor 10 is connected to a point of twice rectified voltage of the voltage-multiplying and rectifying circuit. This modification operates in the same manner as that shown in FIG. 8. Where the current flowing through the varistor 10 is small it can not vary the inductance of the coil 53 of the saturable reactor. In such a case a suitable amplifier, not shown, may be interposed between varistor 10 and coil 15.

While in these embodiments, means for detecting the increments of the output of the piezoelectric element has been shown as comprising a varistor it may be replaced by any DC constant voltage element such as a Zenor diode where the increments of the output of the piezoelectric element are detected after the output has been rectified as shown in FIGS. 6, 7 and 9.

While the invention has been shown and described in terms of preferred embodiments thereof it will be clear that many changes and modifications will occur to one skilled in the art within the spirit and scope of the invention as defined in the appended claims.

What is claimed is:

1. A high-voltage source device comprising a piezoelectric element including a driving electrode and a high-impedance output electrode, a driving source for applying a driving voltage to said driving electrode of said piezoelectric element, a rectifier circuit connected to said output electrode of said piezoelectric element, circuit means including an AC constant voltage element and a capacitor connected to the juncture between said output electrode and said rectifier circuit for applying AC and blocking DC potentials to said AC constant voltage element, and a load connected to said rectifier circuit, said AC constant voltage element operating to shunt increments of the output from said piezoelectric element caused by the variation of said load.

2. A high-voltage source device comprising a piezoelectric element including a driving electrode and a high-impedance output electrode, a driving source for applying a driving voltage to said driving electrode of said piezoelectric element, a voltage-multiplying and rectifying circuit connected to said output electrode, a load connected across the output terminals of said voltage-multiplying and rectifying circuit, and a constant voltage element connected to a point of twice rectified voltage less than the output voltage of said voltage-multiplying and rectifying circuit, said constant voltage element operating to shunt the increments of the output created at said point of twice rectified voltage by the variation of said load.

3. A high-voltage source device comprising a piezoelectric element including a driving electrode and an output electrode, a resonance circuit to supply a driving voltage to said driving electrode of said piezoelectric element, a rectifier circuit connected to said output electrode, a load circuit connected across output terminals of said rectifier circuit, and a series circuit including an AC constant voltage element connected to the juncture between said output electrode and said rectifier circuit and an inductance coil electromagnetically coupled to said resonance circuit, said AC constant voltage element operating to shunt the increments of the output of said piezoelectric element caused by the variation of said load circuit to shift the resonance frequency of said resonance circuit to decrease the output of said piezoelectric element 4. A high-voltage source device comprising a piezoelectric element including a driving electrode and an output electrode, a resonance circuit to supply a driving voltage to said driving electrode of said piezoelectric element, a voltage-multiplying and rectifying circuit connected to said output electrode, a load circuit connected across the output terminals of said voltage-multiplying and rectifying circuit, and a series circuit including a constant voltage element connected to a point of twice rectified voltage of said voltage-multiplying and rectifying circuit and an inductance coil of saturable reactor electromagnetically coupled with said resonance circuit, said series circuit operating to shunt the increments of the output created at said point of twice voltage by the variation of said load to shift the resonance frequency of said resonance circuit to decrease the output of said piezoelectric element.

* * * * *